US009399844B1

(12) United States Patent
King

(10) Patent No.: US 9,399,844 B1
(45) Date of Patent: Jul. 26, 2016

(54) PAVEMENT MARKER MODULES

(71) Applicant: EVOLUTIONARY MARKINGS, INC., Boise, ID (US)

(72) Inventor: Charles L. King, Boise, ID (US)

(73) Assignee: Evolutionary Markings, Inc., Boise, ID (US)

( * ) Notice: Subject to any disclaimer, the term of this patent is extended or adjusted under 35 U.S.C. 154(b) by 54 days.

(21) Appl. No.: 14/595,600

(22) Filed: Jan. 13, 2015

Related U.S. Application Data

(60) Provisional application No. 61/928,602, filed on Jan. 17, 2014, provisional application No. 61/926,616, filed on Jan. 13, 2014.

(51) Int. Cl.
| *E01F 9/00* | (2016.01) |
| *E01F 9/053* | (2006.01) |
| *E01F 9/08* | (2006.01) |
| *F21V 8/00* | (2006.01) |
| *F21V 23/00* | (2015.01) |
| *F21Y 101/02* | (2006.01) |
| *F21W 111/02* | (2006.01) |

(52) U.S. Cl.
CPC ............... *E01F 9/002* (2013.01); *E01F 9/007* (2013.01); *E01F 9/0536* (2013.01); *E01F 9/085* (2013.01); *F21V 23/003* (2013.01); *G02B 6/0011* (2013.01); *F21W 2111/02* (2013.01); *F21Y 2101/02* (2013.01)

(58) Field of Classification Search
CPC . F21V 23/003; F21V 23/0414; G02B 6/0011; F21W 2111/02; F21W 2111/06; F21Y 2102/02; E01F 9/20; E01F 9/559; B64F 1/20; B64F 1/205; F21S 8/022; F21L 4/00; F21L 4/08
See application file for complete search history.

(56) References Cited

U.S. PATENT DOCUMENTS

| 5,013,181 | A | 5/1991 | Harrison |
| 5,523,929 | A | 6/1996 | Ogihara |
| 5,669,691 | A | 9/1997 | Barrow |
| 5,782,552 | A | 7/1998 | Green et al. |
| 5,785,410 | A | 7/1998 | Branson |
| 5,839,816 | A | 11/1998 | Varga et al. |
| 5,984,570 | A | 11/1999 | Parashar |
| 6,210,017 | B1 | 4/2001 | Miura et al. |
| 6,354,714 | B1 | 3/2002 | Rhodes |
| 6,554,452 | B1 | 4/2003 | Bourn et al. |
| 6,602,021 | B1 | 8/2003 | Kim |
| 6,739,735 | B2 | 5/2004 | Talamo et al. |
| 6,866,394 | B1 * | 3/2005 | Hutchins ............ F21S 4/28 362/192 |
| 7,021,786 | B1 * | 4/2006 | Sandor, Sr. ............ E04F 15/08 362/145 |

(Continued)

OTHER PUBLICATIONS

MIDE, Volture piezoelectric energy harvesters, Revision No. 002, Jan. 23, 2013.

*Primary Examiner* — Peggy Neils
(74) *Attorney, Agent, or Firm* — Scott D. Swanson; Shaver & Swanson, LLP

(57) ABSTRACT

A pavement marker module for use for enhancing or replacing line striping and other applications such as crosswalks, parking lots, bridges, barriers, and specialty applications at street intersections. The pavement marker module having housing containing a light source, a light guide optically coupled to the light source for directing light, an energy storage system for storing electrical current and for supplying electrical current to the light source, and a charging system for generating electrical current for recharging said energy storage system.

20 Claims, 6 Drawing Sheets

(56) References Cited

U.S. PATENT DOCUMENTS

| | | |
|---|---|---|
| 7,273,328 B2 | 9/2007 | Hunter et al. |
| 7,419,282 B2 * | 9/2008 | Hoffmann ................. F21S 8/02 362/147 |
| 8,251,550 B2 | 8/2012 | Lai |
| 2007/0070618 A1 * | 3/2007 | Talamo .................... F21S 4/20 362/153.1 |
| 2010/0220495 A1 * | 9/2010 | Truesdale ............ H01H 13/023 362/581 |

\* cited by examiner

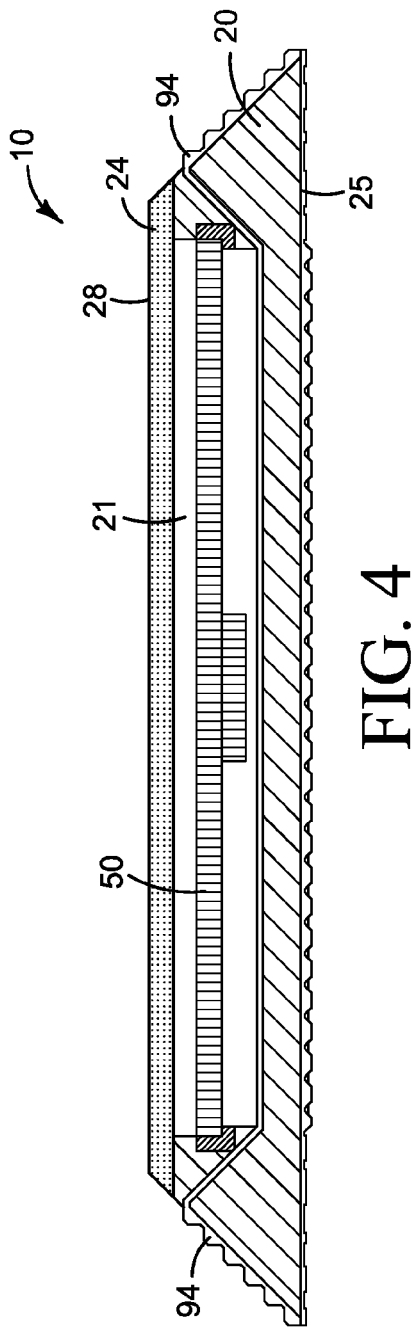
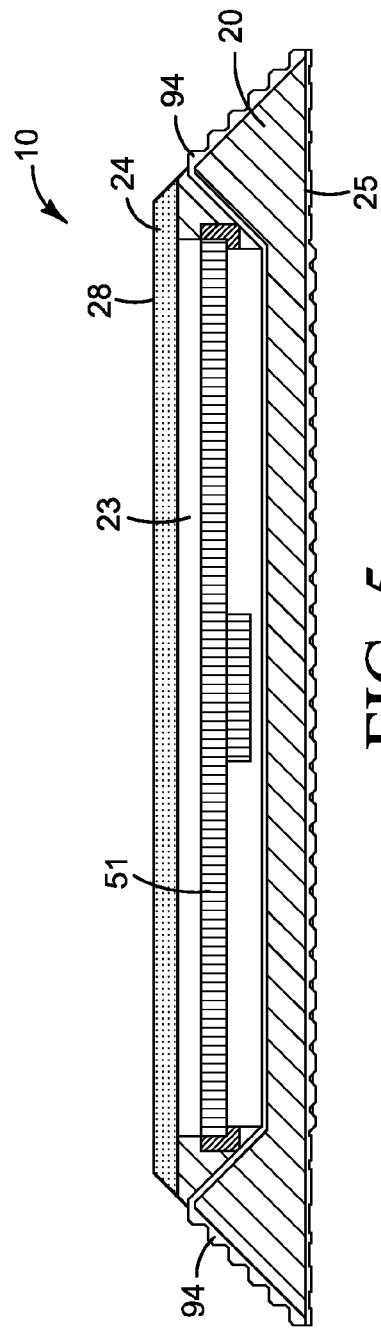

PAVEMENT MARKER MODULES

PRIORITY/CROSS-REFERENCE TO RELATED APPLICATIONS

This application claims the benefit of U.S. Provisional Application No. 61/926,616, filed Jan. 13, 2014, and U.S. Provisional Application No. 61/928,602, filed Jan. 17, 2014, the disclosures of which are incorporated by reference.

TECHNICAL FIELD

The disclosure generally relates to the field of roadway safety, and particular embodiments relate to pavement marker modules.

SUMMARY OF THE DISCLOSURE

Disclosed herein are exemplary pavement marker modules. Exemplary pavement marker modules can be used for enhancing or replacing line striping and other applications such as crosswalks, parking lots, bridges, barriers, and specialty applications at street intersections. Exemplary pavement marker modules can also be used for streets, highways, tunnels, airports, port and trucking facilities, and anywhere else vehicles operate on a ground surface. Exemplary pavement marker modules can also be used for walkways. Exemplary pavement marker modules provide delineation of operating lanes and hazards alongside the lanes or facility, and can reduce accidents resulting from loss of visibility of facility and erring from a safe path. Exemplary pavement marker modules can also increase efficiency of operations in facilities by allowing quicker movements of vehicles due to clarity of safe paths for that movement.

Additional understanding of the devices contemplated and/or claimed by the inventor can be gained by reviewing the detailed description of exemplary devices, presented below, and the referenced drawings.

BRIEF DESCRIPTION OF THE DRAWINGS

FIG. 4 is a cross-sectional view of the first exemplary pavement marker module of FIG. 1, taken along line 4-4.

FIG. 5 is a cross-sectional view of the first exemplary pavement marker module of FIG. 1, taken along line 5-5.

DEFINITIONS

Figure 1:
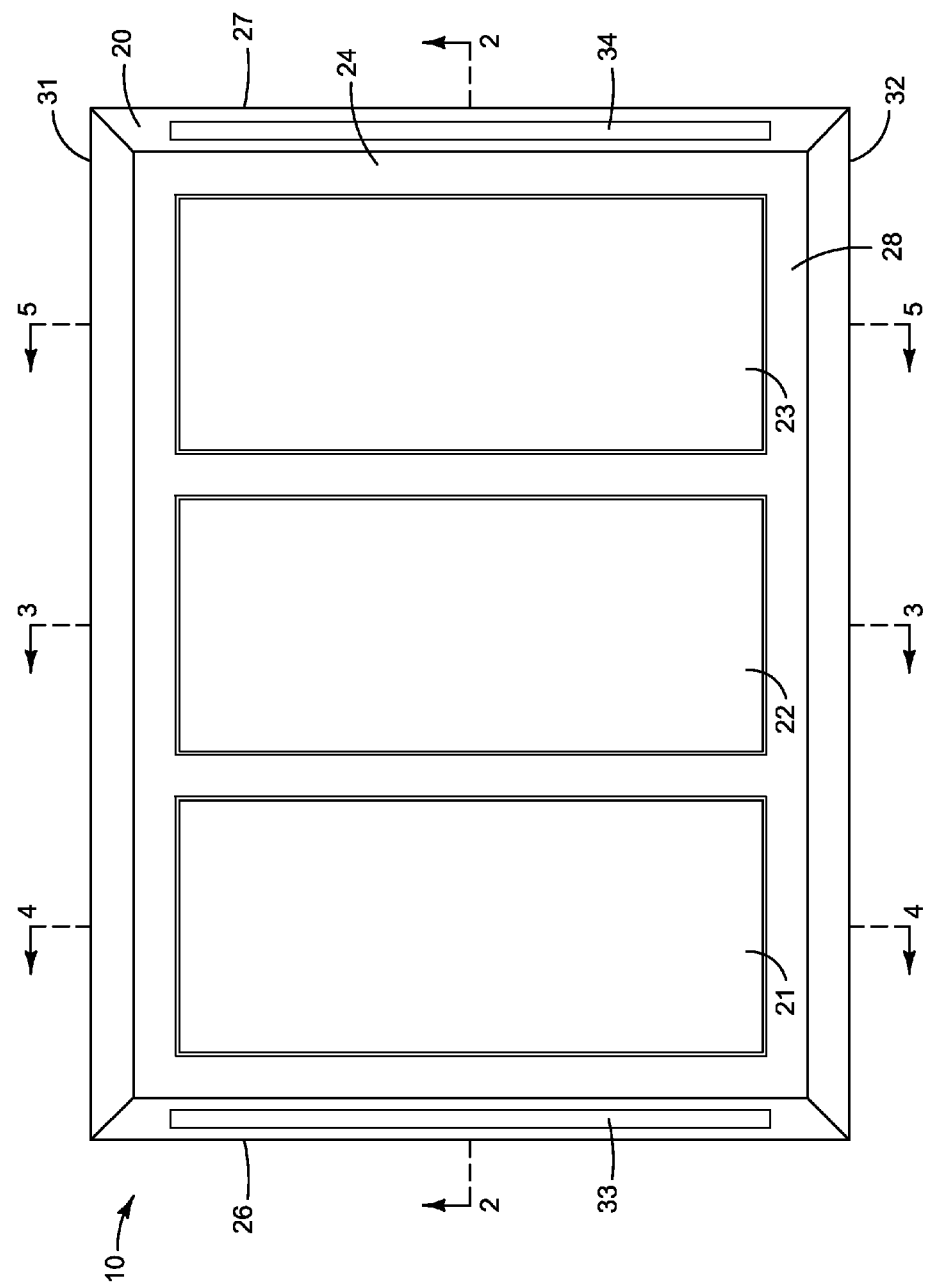
FIG. 1 is a top plan view of a first exemplary pavement marker module.

The use of "e.g.," "etc," "for instance," "in example," "for example," and "or" and grammatically related terms indicates non-exclusive alternatives without limitation, unless the context clearly dictates otherwise. The use of "including" and grammatically related terms means "including, but not limited to," unless the context clearly dictates otherwise. The use of the articles "a," "an" and "the" are meant to be interpreted as referring to the singular as well as the plural, unless the context clearly dictates otherwise. Thus, for example, reference to "a light-emitting diode" includes two or more such light-emitting diodes, and the like. The use of "optionally," "alternatively," and grammatically related terms means that the subsequently described element, event or circumstance may or may not be present/occur, and that the description includes instances where said element, event or circumstance occurs and instances where it does not. The use of "preferred," "preferably," and grammatically related terms means that a specified element or technique is more acceptable than another, but not that such specified element or technique is a necessity, unless the context clearly dictates otherwise. The use of "exemplary" means "an example of" and is not intended to convey a meaning of an ideal or preferred embodiment. Words of approximation (e.g., "substantially," "generally"), as used in context of the specification and figures, are intended to take on their ordinary and customary meanings which denote approximation, unless the context clearly dictates otherwise.

The use of "light guide" means an element optically coupled to a light source and configured for diffusing light and directing light emitted by the light source, unless the context clearly indicates otherwise.

The use of "energy storage system" means a system that stores electrical energy for powering an electrical device, including but not limited to batteries, rechargeable batteries, capacitors, advanced capacitors, supercapacitors, ultracapacitors, fuel cells, vibration energy harvesting devices, and combinations thereof, unless the context clearly indicates otherwise.

The use of "vibration energy harvesting device" means a device that converts vibrations and/or movements of environmental surfaces into electrical energy, unless the context clearly indicates otherwise. Examples of vibration energy harvesting devices include, but are not limited to piezoelectric energy harvesters, electrostatic energy harvesters, and electromagnetic electric harvesters.

The use of "solar cell" means an electrical device that converts the energy of light directly into electricity by the photovoltaic effect, unless the context clearly indicates otherwise.

The use of "solar module" means a solar cell or a connected assembly of solar cells, and includes, but is not limited to, crystalline silicon modules, paint-on solar materials, and thin-film modules, unless the context clearly indicates otherwise.

The use of "translucent" means light pervious, unless the context clearly indicates otherwise.

The use of "charging system" means a system for the charging and/or discharging of at least one energy storage system, unless the context clearly indicates otherwise. A charging system can include one or more solar modules, vibration energy harvesting devices, and combinations thereof.

The use of "control system" means any type of device for controlling the operation of one or more components of a pavement marker module, unless the context clearly indicates otherwise.

The use of "sensor" means a device that detects events or changes in quantities and provides a corresponding output, generally as an electrical or optical signal, unless the context clearly indicates otherwise. Examples of sensors include, but are not limited to: acoustic sensors, vibration sensors, electrical sensor, electric current sensors, electric potential sensors, magnetic sensors, radio sensors, environmental sensors, moisture sensors, humidity sensors, motion sensors, position sensors, angle sensors, displacement sensors, distance sensors, speed sensors, acceleration sensors, photodetectors, optical sensors, light sensors, pressure sensors, thermal sensors, and proximity sensors.

The use of "photodetector" means a sensor of light or other electromagnetic energy, unless the context clearly indicates otherwise.

The use of "electrical circuit load" means one or more of components that consume electrical energy within a system, unless the context clearly indicates otherwise.

The use of "printed circuit board" means a device that mechanically supports and electrically connects electronic components together, for instance using nanotechnology conductive substrates that may not contain copper, conductive tracks, pads and other features etched from copper sheets laminated onto a non-conductive substrate, unless the context clearly indicates otherwise.

The use of "adhesive" means any substance applied to the surfaces of materials that binds them together and resists separation, unless the context clearly indicates otherwise.

The use of "port" means a connection to which a peripheral device connects and through which electricity can travel, unless the context clearly indicates otherwise.

The use of "converts" means to change something's character; to change from one character, form, or function to another, unless the context clearly indicates otherwise.

The use of "transported" means to move from one place to another; transfer, unless the context clearly indicates otherwise.

The use of "light source" means an element for generating visible light, including but not limited to electroluminescent lamps (e.g., light-emitting diodes, electroluminescent paint, electroluminescent wires), unless the context clearly indicates otherwise.

The use of "light-emitting diode" means a semiconductor diode that emits light when a voltage is applied to it, unless the context clearly indicates otherwise.

The use of "pavement" means a durable surface intended to sustain vehicular or foot traffic, unless the context clearly indicates otherwise.

The use of "piezoelectric material" means any material capable of developing an electrical charge on its surface in response to mechanical stress exerted upon or near it, unless the context clearly indicates otherwise. Such materials include, but are not limited to, quartz, berlinite, gallium, barium titanate, lead zirconate titanate, zinc oxide, and aluminum nitride.

DETAILED DESCRIPTION

The following description and the referenced drawings provide illustrative examples of that which the inventor regards as his invention. As such, the embodiments discussed herein are merely exemplary in nature and are not intended to limit the scope of the invention, or its protection, in any manner. Rather, the description and illustration of these embodiments serve to enable a person of ordinary skill in the relevant art to practice the invention.

The drawings illustrate a first exemplary pavement marker module which incorporates components which alone or in combination make up various other exemplary pavement marker modules. The specification describes a number of different exemplary pavement marker modules, including the first exemplary pavement marker module. These exemplary pavement marker modules may include some, most, or all of the components illustrated with respect to the first exemplary pavement marker module, and the mere inclusion of a component within the first exemplary pavement marker module is not intended to expressly or implicitly imply that every exemplary pavement marker module will include such a component.

The first exemplary pavement marker module 10 is illustrated in FIGS. 1 through 9. The pavement marker module 10 comprising a housing 20, a light source 40, a light guide 50, an energy storage system 60, and a charging system 70. Optionally, one or more of a second light source 41, a second light guide 51, and a second energy storage system 65 could be provided.

Preferably, the housing 20 is designed using materials that will withstand up to twenty tons of pressure, and is designed to be fully enclosed and weather resistant. The exposed surfaces of the housing 20 can be coated with a proprietary non-stick polymer coating to minimize contamination of the top lens covering to maintain maximum light transmission, both for energy collection and light dissemination, and to minimize abrasion of the unit.

The housing 20 has a top side 28 spaced apart from a bottom side 25, a first end 26 spaced apart from a second end 27, and a first side 31 spaced apart from a second side 32.

One example of a potential size of a housing is 0.75-inches thick, four-inches wide, and eight-inches long. A skilled artisan will be able to select an appropriate size, structure and material for the housing in a particular embodiment based on various considerations, including the intended use of the pavement marker module, the intended arena within which the pavement marker module will be used, and the equipment and/or accessories with which the pavement marker module is intended to be used, among other considerations. For instance, the housing 20 could comprise a polycarbonate material. Materials hereinafter discovered and/or developed that are determined to be suitable for use in pavement marker module devices would also be considered suitable for use in a pavement marker module according to a particular embodiment, including but not limited to polymers, glass, glass fibers, metal, or ceramics.

Preferably, adjacent the first end 26 is a reflective portion 33, and/or adjacent the second end 27 is a reflective portion 34. By being located on the first end 26 and/or the second end 27 of the housing 20, the reflective portions 33, 34 are configured for facing oncoming traffic. Preferably, the reflective portions 33, 34 are configured at an angle such that the reflective portions 33, 34 catches and reflects light emitted from an oncoming vehicle back towards the oncoming vehicle. In such a configuration, oncoming vehicles are able to observe both the reflection from their own headlights (off reflective portions 33, 34), and light emanating from light source 40 of the pavement marker module 10. The reflective portions work even when the light source 40 of the pavement marker module 10 is not emitting light. It is preferred that the reflective portions provide minimum daylight reflectance within ten points of AASHTO or state departments of transportation requirements.

Figure 8:
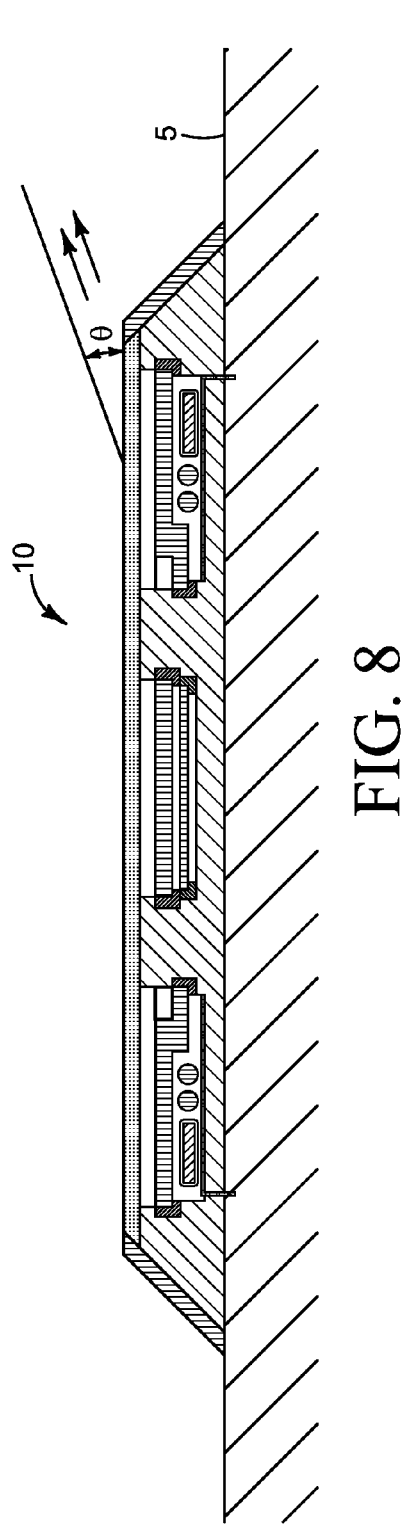
FIG. 8 is a first environmental view of an exemplary pavement marker module installed on a pavement surface.
Figure 9:
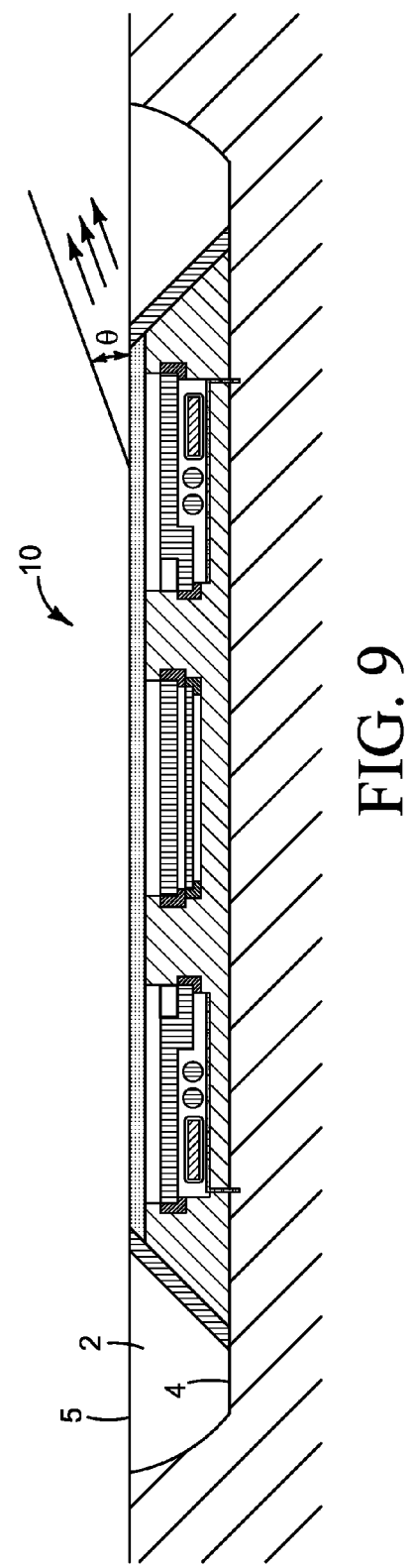
FIG. 9 is a second environmental view of an exemplary pavement marker module installed in a groove in a pavement surface.

The pavement marker module 10 is configured for attachment to a mount surface. A first example of a mount surface is a pavement surface 5, as illustrated in FIG. 8, upon which the pavement marker module 10 is placed. A second example of a mount surface is a channel surface 4 of a channel 2 defined in a pavement surface 5, as illustrated in FIG. 9. Such a channel 2 could be generally 0.75 inches deep, and thirty-inches long. In such a configuration, the top side 28 of the pavement marker module 10 is preferably slightly recessed below the pavement surface 5, but could be generally coplanar with the pavement surface 5, being anywhere from raised above, to flush with, to recessed below.

The attachment to the mount surface can be done through any common methods/apparatuses, a skilled artisan will be able to select an appropriate structure and material for the attachment in a particular embodiment based on various considerations, including the intended use of the pavement marker module, the intended arena within which the pavement marker module will be used, and the equipment and/or accessories with which the pavement marker module is intended to be used, among other considerations. For instance, the bottom side 25 of the housing 20 could be fastened to the mount surface via a mechanical fastener, such as a screw. For instance, the bottom side 25 of the housing 20 could be fastened to the mount surface via an adhesive attachment. In one example of an adhesive attachment, a first side of double sided adhesive tape is applied to at least a portion of the bottom side 25 of the housing 20, and the housing 20 is pressed against the mount surface so that the second side of the double sided adhesive tape adheres to the mount surface.

Another example of a mechanical fastener comprises at least one connector portion defined in the housing, for instance on or adjacent the bottom side of the housing. The connector portion could be configured for engagement with a mating connector(s) on a base portion. The base portion can be attached to the pavement surface (or within a channel within the pavement surface), through a mechanical fastener, adhesive or other mechanism, and the connector portion of the housing can then be connected to the base portion, for instance through slideable engagement. An adhesive could further be used to lock the connector portion and the base portion together.

In an exemplary pavement marker module, the housing defines at least one cavity for receiving components. In the first exemplary pavement marker module 10, the housing 20 defines a first cavity 21, a second cavity 22, and a third cavity 23. The top side 28 defining at least one cavity opening therethrough for providing access to said cavity or cavities. In other exemplary pavement marker modules, all of the components could be located within the same cavity, or in multiple cavities.

Preferably, the components within each cavity are protected by at least one shock pad, such as a silicone shock pad. The shock pads further protect the components of the pavement marker module from high impact forces applied to the housing.

The first cavity 21 comprises a light guide 50 and an energy storage system 60. The light guide 50 mounted within the first cavity 21. The light guide 50 is optically coupled to a light source 40. The light guide 50 is configured for deflecting or otherwise scattering light emitted by the light source 40 at a predetermined angle or range of angles therefrom in a desired direction, causing light emitted therefrom to exit the light guide 50, be transmitted through the cover 12, and away from the pavement marker module 10. For instance, in an outward direction at a fixed angle Θ, as illustrated in FIGS. 8 and 9. It is preferred that the light guide 50 diffuses light so it is evenly spread along a lighted surface.

The light guide 50 is further configured such that it may be elongated. Additionally, the light guide 50 can be coupled with additional light guides 50' and even more elongated lighted surface. Such a feature is particularly advantageous in locations where it is difficult to delineate various roadway segments.

The light source 40 is electrically connected to the energy storage system 60, for instance through electrical wiring. The first cavity 21 may include one or more ports defined therethrough for allowing the components in the first cavity 21 to be connected with components in other cavities. The first cavity 21 further comprising at least one ledge 52. The light guide 50 and/or the light source 40 connecting with the first cavity 21 at the ledge 52, preferably resting upon at least one shock pad 53 configured for absorbing shock and protecting the components from damage.

The light source 40 can be any desired color, and a skilled artisan will be able to select an appropriate light source and color(s) of light in a particular embodiment based on various considerations, including the intended use of the pavement marker module, the intended arena within which the pavement marker module will be used, and the equipment and/or accessories with which the pavement marker module is intended to be used, among other considerations. For instance, the light source 40 could be white and/or yellow light-emitting diodes and the light source 42 could be red light-emitting diodes so that traffic in a first direction would see white or yellow light, whereas traffic in a second (incorrect) direction would see red light. In another example, the light source(s) could be tri-color light-emitting diodes with red, green and blue emitters allowing the color light emitted to be varied as desired. In another example, the light source(s) could be blue light-emitting diodes for emitting blue light.

The energy storage system 60 provides electrical power to the light source 40, and is electrically connected to a charging system 70 for permitting the energy storage system 60 to be recharged.

Preferably, the energy storage system 60 is a direct current (DC) system. Benefits of a direct current system include that the preferred light source (light-emitting diodes) and other system components are configured for using direct current; a direct current system is low-voltage; and a direct current system is easy to install and maintain.

An exemplary energy storage system may include one or more energy storage devices (e.g., a battery, an ultracapacitor), one or more vibration energy harvesting devices, or a combination thereof. The energy storage devices utilized by an energy storage system 60 can be independent from one another, or can be connected together (e.g., in series, in parallel). The energy storage system 60 illustrated in the figures includes an ultracapacitor 61, a battery 62, and a vibration energy harvesting device 63.

The second cavity 22 comprises at least one control system 80 and at least one solar module 72. The control system 80 may mount within the second cavity 22 upon one or more ledges 58. Preferably such a mount includes one or more shock pads 59.

The control system 80 controls the operation of one or more components of the pavement marker module 10. In some exemplary pavement marker modules, the control system could include a central processing unit. In other exemplary pavement marker modules, the control system could be a simple circuit for receiving electrical inputs and providing an electrical output according to the inputs. An exemplary control system may comprise computer logic, memory, timers, sensors, transmitters, receivers, and/or data recording and/or output means.

An exemplary control system may include a process and method for optimizing a particular performance objective by: measuring various energy storage parameters, making decisions based on these parameters, and commanding or halting the transfer of electrical energy accordingly. An exemplary control system may further controls the energy flow from the energy producing system to the energy storage system and how it is delivered to the electrical circuit load.

An exemplary control system 80 may include one or more controllers for managing charging of the energy storage system 65 and delivery of energy to the electrical circuit load. Control of the operative connection between the energy storage system 65, the control system 80, and the electrical circuit load may be done by electronics, circuitry, and/or semiconductors. The controller(s) preferably continually monitor system performance (amount of energy produced, amount of energy consumed—both daily and weekly) to proactively manage how energy is stored and delivered to the electrical circuit load. For example, if there are several days of lower than usual energy production from the charging system 70 (several cloudy days), the control system 80 could restrict the delivery of power to the electrical circuit load in order to conserve energy until the sun comes out again. The controller(s) preferably control the speed and the amount that the energy storage system 65 components, particularly the batteries, are charged and discharged, which can significantly affect life.

A controller could deliver a low-current (trickle) charge from the charging system 70 to the energy storage system 65. Such a controller could also limit the maximum voltage to a voltage that will not damage or degrade the components of the energy storage system 65. A controller could draw current from the energy storage system 65 and deliver it to the electrical circuit load. The minimum battery voltage is also protected by the controller to prevent excessive battery drain. During prolonged periods of inclement weather and low daytime energy generation, the controller could dim the lights during part or all of the night to reduce the amount of energy being consumed while still providing some functionality. For example, a controller could turn the light source ON based on a signal from a sensor, and OFF with a time clock. For example, a controller could turn the light source ON and OFF based on one or more signals from a sensor (e.g., photodetector).

The system may be controlled according to a chart, table, instructions or other data that defines light levels for various times of the night for example, providing brighter light during the first few hours, then dimming down for one or several time periods. For instance, two hours at a first lighting level, followed by one hour at a second lighting level, one hour at a third level, three hours at a fourth level, then back to the first level for the remaining hour(s) of the night. Lighting levels can also be adjusted as required to accommodate changes in the weather, thereby, for instance, proactively conserving energy after the first cloudy day.

The control system 80 may comprise only electronics and apparatus to operate the single pavement marker module, or may additionally comprise electronics and apparatus that communicate with a central control station and/or with other pavement marker modules. Such communication could be accomplished wirelessly, for example, by means of a "multiple-node" or "mesh" network (e.g., ZigBee, Z-Wave) and/or other wireless systems such as WiFi, cell-phone radio and/or satellite communication. Such a network of multiple pavement marker modules and a central control station may allow monitoring, and/or control of, the performance of individual pavement marker modules and groups of pavement marker modules. Such performance monitoring and/or control may enhance public safety and improve maintenance and reduce the cost of said maintenance. A central control station may take the form of, or be supplemented by, a server accessible via an internet website, for example.

The control system 80 is configured for managing the operation of the first exemplary pavement marker module's electronics. This electrical management is conducted through electrical connections. The control system 80 is electrically connected to the energy storage system 60, the solar module 72, the first light source 40, and/or the second light source 42, for instance through electrical wiring. The second cavity 22 may include one or more ports defined therethrough for allowing the components in the second cavity 22 to be connected with components in other cavities. The second cavity 22 further comprising at least one ledge 54. The solar module 72 and/or control system 80 may be connected with the second cavity 22 at the ledge 54, preferably resting upon at least one shock pad 55 configured for absorbing shock and protecting the components from damage.

In this exemplary pavement marker module 10, the third cavity 23 comprises a light guide 51 and an energy storage system 65. The light guide 51 mounted within the third cavity 23. The light guide 51 is optically coupled to a second light source 42. The light guide 51 is configured for deflecting, diffusing or otherwise scattering light emitted by the light source 42 at a predetermined angle or range of angles therefrom in a desired direction, causing light emitted therefrom to exit the light guide 51, be transmitted through the cover 12, and away from the pavement marker module 10.

The light source 42 is electrically connected to the energy storage system 65, for instance through electrical wiring. The third cavity 23 may include one or more ports defined therethrough for allowing the components in the third cavity 23 to be connected with components in other cavities. The third cavity 23 further comprising at least one ledge 56. The light guide 51 and/or the light source 42 connecting with the third cavity 23 at the ledge 56, preferably resting upon at least one shock pad 57 configured for absorbing shock and protecting the components from damage.

The energy storage system 65 provides electrical power to the light source 40, and is electrically connected to a charging system 70 for permitting the energy storage system 65 to be recharged. The energy storage system 65 may comprise one or more of an ultracapacitor 66, a battery 67, or a vibration energy harvesting device 68.

The preferred energy storage device is an ultracapacitor. Where batteries are used in an exemplary energy storage system, preferred batteries include, but are not limited to lithium iron phosphate batteries, sealed lead-acid AGM-type batteries, gel-cell batteries, nickel-metal hydride batteries, and lithium batteries. It is desirable to maintain the batteries within a moderate temperature range, for example, 40 to 90 degrees F. as exposure of the batteries to temperatures outside that range will tend to degrade battery performance and life. Daily battery performance may be reduced by more than fifty percent (50%) by temperature extremes, and batteries may stop working entirely in very low temperatures. Further, high temperatures tend to also degrade battery performance and life. In the preferred configuration, the batteries are surrounded on multiple sides by insulation for protecting the batteries from temperature extremes. The insulation for helping keep the temperature of the batteries above about 40 degrees F. in the winter, and below about 90 degrees F. in the summer.

By using larger and/or more numerous solar modules, it is preferred that the charging system generate excess energy (beyond what the pavement marker module will utilize in a given day), and that that excess energy will be stored within the energy storage system. By doing so, even on a cloudy day the solar modules will generate enough electrical current (stored in the energy storage system) to provide a complete and full charge for use by the system that night. Further, the utilization of at least one vibration energy harvesting device is beneficial for supplementing the energy generation by the solar module, particularly on cloudy days when the solar module's power output may be decreased. These methods greatly reduce and potentially eliminate entirely the need to conserve the energy output as described in the control system.

The vibration energy harvesting device can convert otherwise wasted energy from mechanical vibrations induced into the pavement by traffic into useable electrical energy. A vibration energy harvesting device not only provides "back-up" power for the charging system, it also is capable of producing energy at night when the solar module of the charging system is not producing electrical current. Additionally, if there are higher energy demands at night, for instance when there is a lot of traffic, the amount of energy produced by the vibration energy harvesting device would increase commensurate with the increase in traffic.

The energy storage system 60 is configured to store the energy provided by the solar module 72 during the day or previous days, and powers the pavement marker module 10 during the night. The energy storage system 60 is adapted to store enough energy to power, when fully charged, the electrical circuit load for several nights with little or no additional charging and without any outside energy input. The energy storage system 60 preferably stores enough energy to power the electrical circuit load for at least five nights and, more preferably, five to nine nights equating to about fifty to one-hundred hours or more depending upon the number of hours in a night. Thus, the pavement marker module 10 is capable of autonomously powering (that is, with only the energy stored by the energy storages system 60 and provided by the charging system 70) the pavement marker module 10 for several, and preferably at least five nights, even when it is located in an overcast, inclement, hazy or smoggy location, all of which conditions will diminish the intensity of the daytime sun. The large amount of energy stored in the energy storage system 60 during days of clearer weather is sufficient to "carry it through" cloudy and inclement weather for about a week, until improved sunlight conditions return.

The cavities of an exemplary housing are covered with at least one translucent protective cover. In the first exemplary pavement marker module 10 illustrated in this Figure, the first cavity 21, the second cavity 22, and the third cavity 23 are jointly covered by protective cover 24. In other exemplary pavement marker modules, each cavity may have its own cover. It is preferred that the protective cover(s) seal the cavity/cavities from the environment. The protective cover 24 comprises any suitable material, including but not limited to high strength glass, plastics, including thermoplastic polymers such as clear polycarbonates, and other translucent polymers. Preferably, the protective cover 24 is resistant to ultraviolet light deterioration, is capable of maintain light transmission, and is of sufficient strength to withstand traffic and equipment impacts, and to withstand abrasion from environmental dust and materials, including that introduced by abrasives applied for winter traction.

Optionally, the polycarbonate cover can be coated with a non-stick polymer coating to protect the cover, to maintain maximum light transmission (for both energy collection and light dissemination), and to minimize abrasion of the unit cover.

The cover 24 is preferably bonded to the housing 20 utilizing an adhesive such that the housing 20 and the cover 24 are able to expand and contact with variant environmental conditions. Preferably, such a bond results in a waterproof seal for the cavity and the components located therein. A skilled artisan will be able to select an appropriate structure and material for the cover in a particular embodiment based on various considerations, including the intended use of the pavement marker module, the intended arena within which the pavement marker module will be used, and the equipment and/or accessories with which the pavement marker module is intended to be used, among other considerations. For instance, the cover 24 could comprise a polycarbonate material. Materials hereinafter discovered and/or developed that are determined to be suitable for use in pavement marker module devices would also be considered suitable for use in a pavement marker module according to a particular embodiment.

Within at least one of the cavities is a light guide 50. The light guide 50 is reflective in nature and directs light omitted from a light source 40 in a desired direction, such as in an outward direction at a desired angle $\Theta$. Angle $\Theta$, can be any angle or range of angles. Preferably, the light guide 50 reflects light at an angle $\Theta$ of generally twenty-five degrees (25°) vertically from the pavement surface 5, towards oncoming traffic. The light guide 50 is preferably designed to provide even diffusion of lighting to avoid glare while clearly delineating the line represented by the markers in the intended viewing direction. The light guide 50 is preferably designed to provide a minimum of twenty degrees to a maximum of seventy degrees horizontal light spread left and right from centerline in the intended lighting direction. The light guide 50 is preferably designed to provide a minimum of zero degrees to a maximum of ninety degrees vertical light spread up from the surface in the intended lighting direction. The light guide 50 is preferably designed to eliminate perceptible light backscatter in the opposite direction from the intended viewing angles. The lighted area is designed to be extended to variable lengths up to one-hundred feet in length, providing a continuously lighted highway stripe.

The light source 40 generates visible light for the pavement marker module 10. The preferred light source 40 comprises one or more electroluminescent lamps (e.g., light-emitting diodes, electroluminescent wires). The light source 40 can include one or more lights providing the specific colors required by the national Manual on Uniform Traffic Control Devices, and may be revised to provide any color required by the specific application.

Components of exemplary pavement marker modules, particularly the light source 40, may be powered ON and OFF by a sensor, by remote wired devices, and/or by remote wireless devices, such as wireless power transmission technology including wireless resonance technology. Further, the components of exemplary pavement marker modules can work in conjunction with lighted marker posts along the roadway, as well as lighting systems that provide lighting on the roadway.

The light source 40 may be operated as a solid light source. The light source 40 may be operated at a single lighting level, or at variable lighting intensity levels. The light source 40 may be operated in a rapid flash mode wherein the flash is not detectable to the human eye rather appears to be a solid light source. The light source 40 may be operated in an emergency flash mode.

The light source 40 is powered by a power source. Examples of power sources include, but are not limited to alternating current sources (e.g., a connection to the power grid), and an energy storage system 60.

The energy storage system 60 can comprise batteries, rechargeable batteries, capacitors, advanced capacitors, supercapacitors, ultracapacitors, fuel cells, and combinations thereof. The energy storage system 60 stores electrical energy for powering the electrical components of the pavement marker module 10, for instance, powering the light source 40 of the pavement marker module 10. The energy storage system 60 can be configured for recharging through use of a charging system 70. Elements of the charging system 70 may comprise the control system 80.

The charging system 70 is for the charging and/or discharging of the energy storage system 60. An exemplary charging system one or more solar modules, vibration energy harvesting devices, and combinations thereof. Further, the charging system could comprise a hard wire connection into power supply, such as a twelve-volt low power supply. The charging system 70 illustrated in the Figures includes a solar module 72 for generating electrical current utilized to recharge the energy storage system 60 and/or power the electrical components of the pavement marker module 10 directly, including the light source 40.

Figure 2:
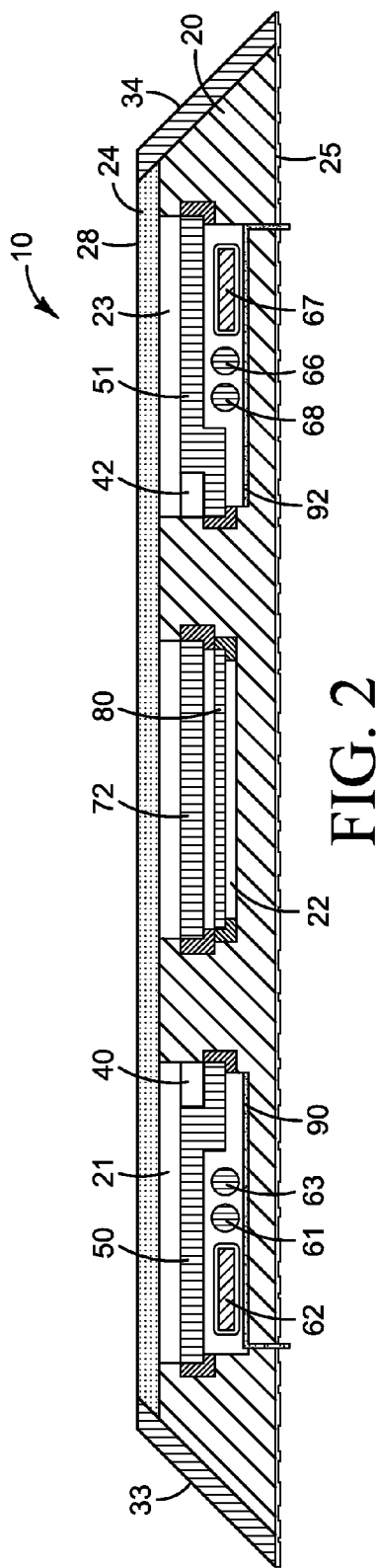
FIG. 2 is a cross-sectional view of the first exemplary pavement marker module of FIG. 1, taken along line 2-2.
Figure 3:
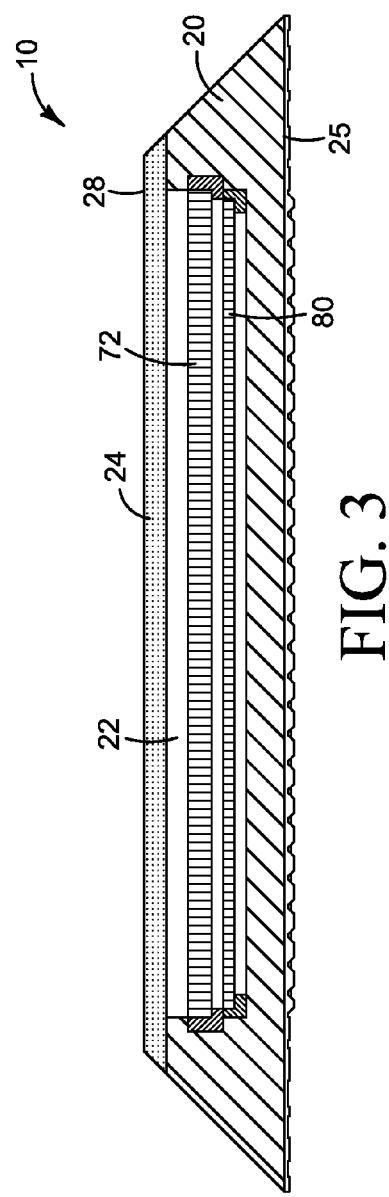
FIG. 3 is a cross-sectional view of the first exemplary pavement marker module of FIG. 1, taken along line 3-3.
Figure 6:
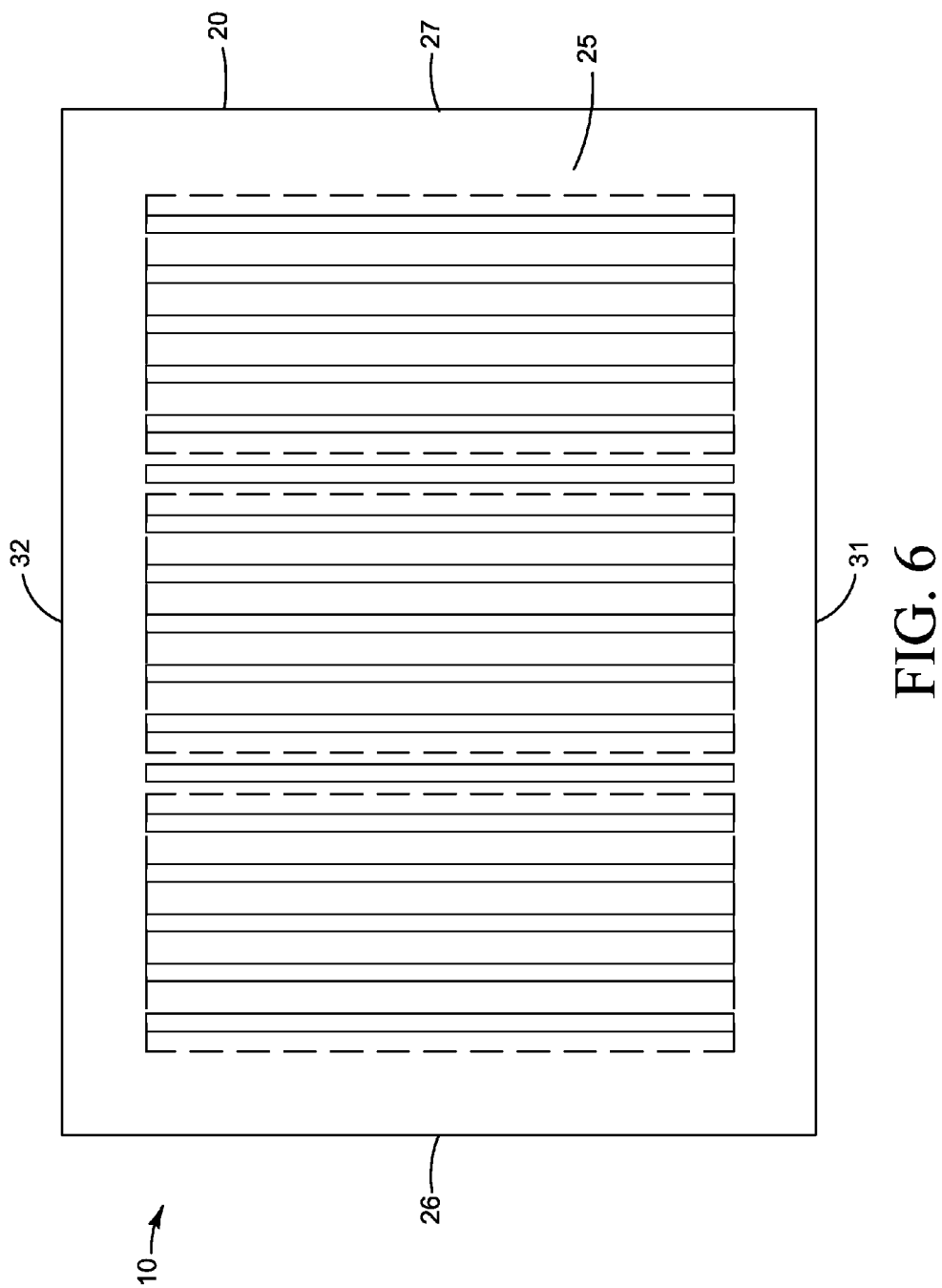
FIG. 6 is a bottom plan view of the first exemplary pavement marker module of FIG. 1.
Figure 7:
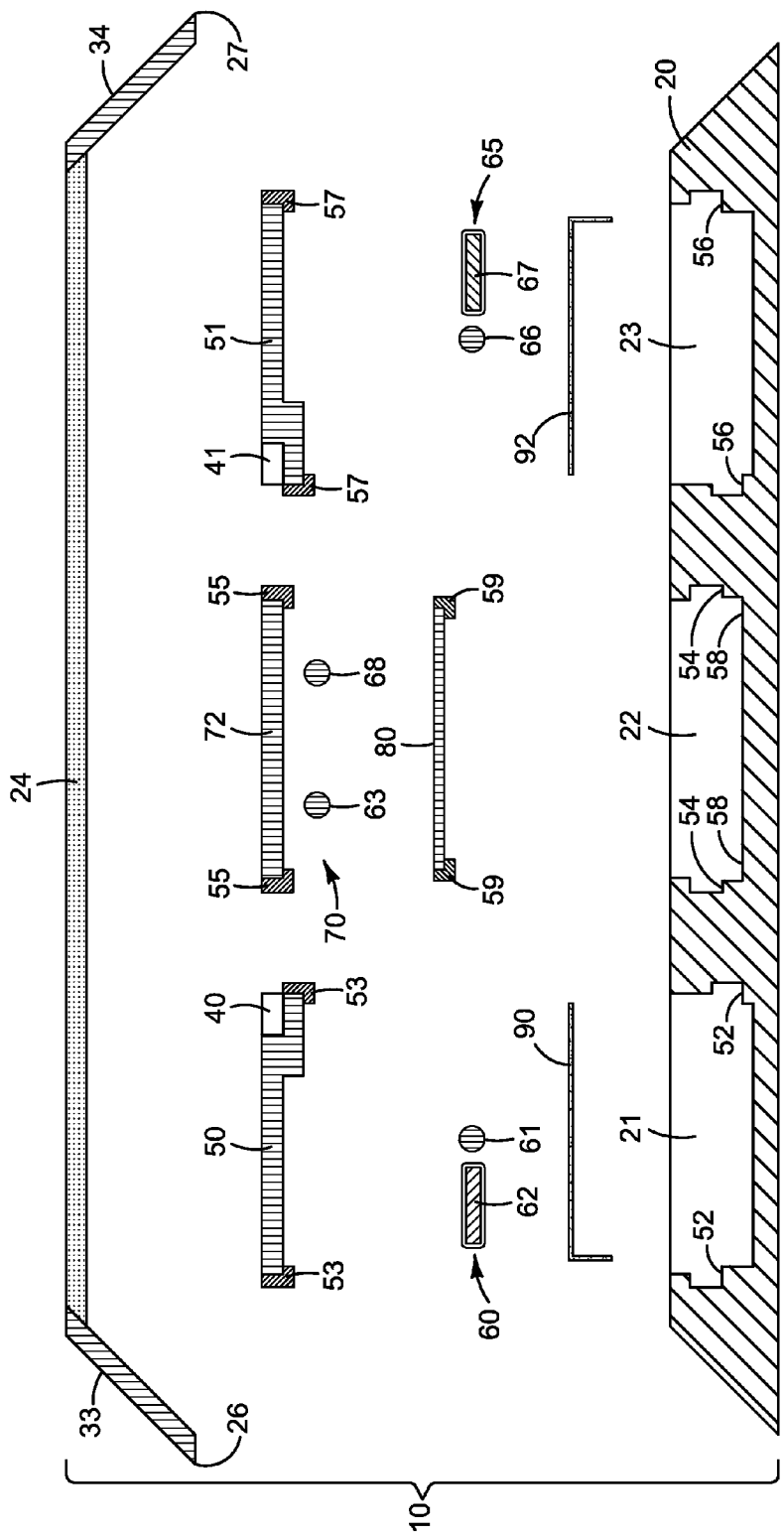
FIG. 7 is an exploded view of the cross-sectional view of FIG. 2.

Referring to FIG. 6, to dissipate the heat generated by the light sources 40, 42, the first cavity 21 may comprise a heatsink 90, and/or the third cavity 23 may comprise a heatsink 92. Such a heatsinks 90, 92 are preferably perpendicular to the length of the housing 20. Such heatsinks 90, 92 can be configured to contact one or more of the internal components inside the housing 20. Such heatsinks 90, 92 can extend through the bottom side 25 of the housing and provide the sink to the earth through the pavement, as illustrated in FIG. 2. Additionally, such heatsinks 90, 92 could extend outside of the cavity in question to an external heatsink portion 94, thereby providing a sink to the atmosphere. Dissipating such excess heat is useful to extend the life of the electrical components of the pavement marker module 10. Such heatsinks may further comprise ribs, dimples, or surface undulations to maximize wetted surface and heat dissipation.

Again, the drawings illustrate a first exemplary pavement marker module which incorporates components which alone or in combination make up various other exemplary pavement marker modules. The specification describes a number of different exemplary pavement marker modules, including the first exemplary pavement marker module. These exemplary pavement marker modules may include some, most, or all of the components illustrated with respect to the first exemplary pavement marker module, and the mere inclusion of a component within the first exemplary pavement marker module is not intended to expressly or implicitly imply that every exemplary pavement marker module will include such a component.

A second exemplary pavement marker module comprises the following components described in detail above with respect to the first exemplary pavement marker module which illustrated in the Figures and described above. The second exemplary pavement marker module comprising a housing, reflector, surface mount, three defined cavities, a piezoelectric vibration energy harvesting device, and at least one light-emitting diode.

The housing of the second exemplary pavement marker comprises a bottom side, first end, second end, top side, first side, and second side. The housing is generally trapezoidal in shape and protects the components held therein. A skilled artisan will be able to select an appropriate structure and material for the housing based on various considerations, including the intended use of the pavement marker module, the intended arena within which the pavement marker will be used, and the equipment and/or accessories with which the pavement marker module is intended to be used, among other considerations.

The first and second ends of the housing of the second exemplary pavement marker comprise reflective portions, configured for facing oncoming traffic. The reflective portions are angled such that light is captured from oncoming vehicles and reflected back towards the vehicle. Such a configuration allows the vehicles to observe both the reflection from their own headlights and the light emanating from the second exemplary pavement marker.

The housing of the second exemplary pavement marker is configured for attachment to a pavement surface by a mechanical fastener, such as an adhesive. An adhesive, such as double-sided tape, is applied to the bottom side of the housing and pressed against the pavement surface. Such a configuration allows for convenient, yet semi-permanent application.

Within the housing of the second exemplary pavement marker are three separate, fully-defined cavities. Each of the cavities are configured for receiving components therein and are protected by at least one shock pad. The first cavity of the second exemplary pavement marker comprises a light guide coupled to a light source and energy storage system. The light guide deflects light from the light source—a light-emitting diode—in an outward direction. Further, the light source is electronically connected to the energy storage system, by electrical wiring, which provides stored power.

The power stored by the energy storage system is created by a piezoelectric vibration energy harvesting device. Such a device converts otherwise wasted energy into usable electric energy. The vibration energy harvesting device comprises a piezoelectric material having the ability to develop an electric charge on its surface as a result of mechanical stress exerted upon or near it. In this exemplary embodiment, the mechanical stress is that of vibrations caused by roadway activity. When vehicles pass by the piezoelectric material captures the vibrations, thus generating an electrical charge. This charge, in turn, both provides backup power for the exemplary pavement marker module and powers it when solar energy is minimal or nonexistent. When producing additional energy, the charging system is able to meet high energy demands as the amount of energy produced is commensurate with increased roadway activity.

The second cavity of the second exemplary pavement marker comprises at least one control system and at least one solar module. The at least one controller controls the speed and amount that the energy storage system is charged and discharged. The control system operates through electrical wiring connections and one or more ports defined through the second cavity. Electrical wiring connections exist between the control system, solar module, light source, and energy storage system.

In addition to being connected to the energy storage system and vibration energy harvesting device, the light source is electrically connected to at least one solar module. The solar module converts ordinary light to electricity and provides the electricity to the light source as its primary source of power. Only when light is absent does the light source use power provided by energy storage system and the vibration energy harvesting device.

Finally, the third cavity of the second exemplary pavement marker comprises an additional light guide coupled to a light source. Like in the first cavity, the light guide deflects light from the light source—one or more light-emitting diodes—in an outward direction. These components, too, are electronically connected to the energy storage system, control system, and solar module by electrical wiring.

A third exemplary pavement marker module comprises the following components described in detail above with respect to the second exemplary pavement marker module and described above. The third exemplary pavement marker module comprising a housing, reflector, surface mount, one defined cavity, a piezoelectric vibration energy harvesting device, and at least one light-emitting diode.

Like the second exemplary pavement marker module, the third exemplary pavement marker module comprises a housing having a bottom side, first end, second end, top side, first side, and second side. The housing is generally trapezoidal in shape and protects the components held therein.

Inside the housing of the third exemplary pavement marker module is a single cavity configured for receiving components therein and is protected by at least one shock pad. Inside the single cavity is at least one light guide coupled to at least one light-emitting diode, a piezoelectric vibration energy harvesting device, at least one control system, and at least one control board. The components are electrically connected through the use of electrical wiring.

A fourth exemplary pavement marker module comprises the following components described in detail above with respect to the second exemplary pavement marker module which is described above. The fourth exemplary pavement marker module comprising a housing, reflector, surface mount, three defined cavities, a piezoelectric vibration energy harvesting device, and at least one light-emitting diode.

Like the second exemplary pavement marker module, the fourth exemplary pavement marker module comprises a housing having a bottom side, first end, second end, top side, first side, and second side. The housing is generally trapezoidal in shape and protects the components held therein.

The housing of the fourth exemplary pavement marker is configured for attachment within a roadway channel. The channel is cut into a pavement surface and has dimensions slightly larger than the housing of the fourth exemplary pavement marker. An adhesive, such as double-sided tape, is applied to the bottom side of the housing and pressed against the surface within the channel. This allows the pavement marker to rest slightly below the pavement surface, providing it with extra protection. Such a configuration allows for convenient, yet semi-permanent application.

A fifth exemplary pavement marker module comprises the following components described in detail above with respect to the second exemplary pavement marker module which is described above. The fifth exemplary pavement marker module comprising a housing, reflector, surface mount, three defined cavities, a electrostatic vibration energy harvesting device, and at least one light-emitting diode.

Like the second exemplary pavement marker module, the housing of the fifth exemplary pavement marker comprises a bottom side, first end, second end, top side, first side, and second side. The housing is generally trapezoidal in shape and protects the components held therein.

Inside the first cavity of the fifth exemplary pavement marker is at least one light guide coupled to a light source and energy storage system. The power stored by the energy storage system is created using an electrostatic vibration energy harvesting device. Such an electrostatic vibration energy harvesting device converts otherwise wasted energy into usable electric energy. The electrostatic vibration energy harvesting device comprises a variable capacitor to generate charges based on motion between two plates. The mechanical movement between the two plates alters capacitance, thus generating an electrical charge. In this exemplary embodiment, motion between the two plates is caused by vibrations resulting from roadway activity. When vehicles pass by the positions of the plates change, thus altering capacitance and creating an electrical charge. This charge, in turn, both provides backup power for the exemplary pavement marker module and powers it when solar energy is minimal or nonexistent. When producing additional energy, the charging system is able to meet high energy demands as the amount of energy produced is commensurate with increased roadway activity.

A sixth exemplary pavement marker module comprises the following components described in detail above with respect to the second exemplary pavement marker module which is described above. The sixth exemplary pavement marker module comprising a housing, reflector, surface mount, three defined cavities, a electrostatic vibration energy harvesting device, and at least one light-emitting diode.

Like the second exemplary pavement marker module, the housing of the sixth exemplary pavement marker comprises a bottom side, first end, second end, top side, first side, and second side. The housing is generally trapezoidal in shape and protects the components held therein.

Inside the first cavity of the sixth exemplary pavement marker is at least one light guide coupled to a light source and energy storage system. The power stored by the energy storage system is created using an electromagnetic vibration energy harvesting device. Such an electromagnetic vibration energy harvesting device converts otherwise wasted energy into usable electric energy. The electromagnetic energy harvesting device comprises a coil and magnet. The mechanical movement of the magnet relative to the coil creates an electromotive force which, through the presence of electrical circuitry, is converted into an electrical charge. In this exemplary embodiment, movement of the magnet relative to the coil is caused by vibrations resulting from roadway activity. When vehicles pass by the position of the magnet, relative to the coil, changes, thus creating an electromotive force. This force, through the presence of electrical circuitry, is then converted into an electrical charge. The charge, in turn, both provides backup power for the exemplary pavement marker module and powers it when solar energy is minimal or nonexistent. When producing additional energy, the charging system is able to meet high energy demands as the amount of energy produced is commensurate with increased roadway activity.

A seventh exemplary pavement marker module comprises the following components described in detail above with respect to the second exemplary pavement marker module which is described above. The seventh exemplary pavement marker module comprising a housing, reflector, surface mount, three defined cavities, and at least one light-emitting diode. Like the second exemplary pavement marker module, the seventh exemplary pavement marker module comprises a housing having a bottom side, first end, second end, top side, first side, and second side. The housing is generally trapezoidal in shape and protects the components held therein. Within the housing of the second exemplary pavement marker are three separate, fully-defined cavities. Each of the cavities are configured for receiving components therein and are protected by at least one shock pad. The first cavity of the second exemplary pavement marker comprises a light guide coupled to a light source and energy storage system. The light guide deflects light from the light source—a light-emitting diode—in an outward direction. Further, the light source is electronically connected to the energy storage system, by electrical wiring, which provides stored power.

The power stored by the energy storage system is created by at least one rechargeable battery. In addition to being electronically connected to the light source, the energy storage system is electrically connected to the pavement marker's solar module. The solar module converts ordinary light to electricity and provides the electricity to both the energy storage system and light module. When light is present, the light module uses the direct electricity generated by the solar module. However, when light is absent, the stored energy becomes the light source's primary source of power.

An eighth exemplary pavement marker module comprises the following components described in detail above with respect to the second exemplary pavement marker module which is described above. The eighth exemplary pavement marker module comprising a housing, a reflector, a surface mount, at least one defined cavity, and at least one light-emitting diode.

Like the second exemplary pavement marker module, the eighth exemplary pavement marker module comprises a housing having a bottom side, first end, second end, top side, first side, and second side. The housing is generally trapezoidal in shape and protects the components held therein. Inside the housing of the eighth exemplary pavement marker module is at least one cavity configured for receiving components therein and is protected by at least one shock pad. Further, the at least one cavity comprises multiple light modules, spaced apart and aligned along a common longitudinal plane. In addition to the multiple light modules, the at least one cavity further comprises at least one solar module also aligned along the common longitudinal plane. The components are electrically connected through the use of electrical wiring such that the at least one solar module converts common light into electricity, thus powering the multiple light modules.

A ninth exemplary pavement marker module comprises the following components described in detail above with respect to the first exemplary pavement marker module which is described above. The ninth exemplary pavement parker module comprising a housing, at least one solar module, a power storage device, a lighting module, an angled lens, and at least one reflector.

The housing of the ninth exemplary pavement marker comprises a flat upper surface, further comprising a cover equipped with at least one angular reflector lens. Additionally, the housing further comprises at least one additional reflector for reflecting light emitted by an automobile back towards the same automobile. Inside the housing is at least one solar module electrically connected to a power storage device. The solar module is configured such that it converts ordinary light into electricity, which is stored by the power storage device.

The power storage device is further electrically connected to the light module of the ninth exemplary pavement marker. Upon receiving stored electricity from the solar module, the power storage unit sends electricity to the light module, thus illuminating at least one light-emitting diode. Further, the housing's angular reflector lens refracts light from the light-emitting diode in a first direction, towards oncoming traffic, preferably, at an angle of 25 degrees vertically from the pavement's surface. This angle allows optimal viewing of the light-emitting diode by oncoming vehicles.

Further, it is preferable that the power storage device is comprised of at least one ultracapacitor, battery, capacitor, or combination thereof. Such a storage device, or combination thereof, enables the tenth exemplary pavement marker to efficiently store electricity for later use.

A tenth exemplary pavement marker module comprises the following components described in detail above with respect to the ninth exemplary pavement marker module which is described above. The tenth exemplary pavement parker module comprising a housing having a first end opposite a second end, the housing having multiple light modules.

The housing of the tenth exemplary pavement marker module further comprises a first end opposite a second end. Additionally, at least one of the ends comprises at least one angular reflector lens and a reflector for reflecting light emitted by an automobile back towards the same automobile. Further, the housing comprises multiple light modules spaced apart and aligned along a common longitudinal plane. The multiple light modules are powered by one or more solar modules, located within the housing, and aligned along the common longitudinal plane.

An eleventh exemplary pavement marker module comprises the following components described in detail above with respect to the ninth exemplary pavement marker module which is described above. The eleventh exemplary pavement marker module comprising an elongated channel carved into a pavement surface and a housing configured for insertion into the channel.

The channel of the eleventh exemplary pavement marker module comprises a length extending from a proximal end to a distal end, defining a planar bottom surface with a tapered edge. The pavement marker's housing is configured for insertion into the channel such that the bottom of the housing fits flushly to and attaches with the channel's planar bottom surface.

Exemplary pavement marker modules can have interoperability with other devices and systems, including but not limited to traffic systems, other pavement marker modules, and vehicles. For instance, the pavement marker module could connect through wired or wireless communications to operate in conjunction with other pavement marker modules, to respond to traffic flow, conditions, events, and emergency situations.

In another example, the pavement marker module could respond to changes in traffic signals. In such a configuration, when a traffic signal turns green, the appropriate traffic lanes could will light accordingly, otherwise will remain dark. Alternatively, appropriately colored pavement marker modules will provide a pavement level indication of green, or when the signal turns red, a pavement level indication of red.

In another example, in the event of an emergency, remote devices employed by traffic management centers, emergency vehicles, or automatic traffic monitoring systems could cause a pavement marker module to go on emergency flash, with an alternative to flash red rather than the normal lane marker color.

In another example, as a part of the energy conservation management, the pavement marker module may cooperate with other pavement marker modules in turning ON before traffic arrives by communicating ahead to turn those pavement marker module ON before the traffic arrives at that location to provide a lighted path for a distance ahead, and turn OFF after a brief time following passage of the traffic.

It is noted that all structures and features of the various described and illustrated embodiments can be combined in any suitable configuration for inclusion in a pavement marker module according to a particular embodiment. For example, a pavement marker module according a particular embodiment can include neither, one, or both of the power storage devices described above.

The foregoing detailed description provides exemplary embodiments of the invention and includes the best mode for practicing the invention. The description and illustration of these embodiments is intended only to provide examples of the invention, and not to limit the scope of the invention, or its protection, in any manner.

The invention claimed is:
1. A pavement marker module comprising:
a housing having a top side spaced apart from a bottom side, said top side defining at least one cavity opening therethrough, said cavity opening providing access to a cavity, said bottom side configured for attachment to a mount surface;

a translucent cover covering said cavity opening;

a light source for generating light, said light source received within said at least one cavity;

a light guide optically coupled to said light source, said light guide configured for directing the light generated by the light source through the translucent cover, said light guide received within said at least one cavity;

an energy storage system for storing electrical current and for supplying electrical current to said light source, said energy storage system received within said at least one cavity; and a charging system for generating electrical current for recharging said energy storage system, said charging system comprising at least one vibration energy harvesting device, said charging system received within said at least one cavity.

2. The pavement marker module of claim 1, further comprising a control system for controlling the operation of the energy storage system and the charging system.

3. The pavement marker module of claim 2, wherein said control system further comprises a controller and a sensor, wherein said controller is configured for turning the light source ON and OFF based on one or more signals from the sensor.

4. The pavement marker module of claim 1, wherein said mount surface is a channel surface within a channel defined in a pavement surface.

5. The pavement marker module of claim 4, wherein upon mounting the pavement marker module in the channel, said top side is generally co-planar with the pavement surface.

6. The pavement marker module of claim 1, wherein the light source comprises at least one light-emitting diode.

7. The pavement marker module of claim 1, wherein the energy storage system comprises at least one ultracapacitor.

8. The pavement marker module of claim 1, wherein the energy storage system comprises at least one battery.

9. The pavement marker module of claim 1, wherein the charging system comprises at least one solar module.

10. The pavement marker module of claim 1, wherein said mount surface is a pavement surface, and wherein said pavement marker module attached to said mount surface through use of at least one adhesive.

11. The pavement marker module of claim 1, further comprising a second light source, and a second light guide optically coupled to said second light source, said second light guide configured for directing the light generated by the second light source.

12. The pavement marker module of claim 1, wherein said housing has a first end spaced apart from a second end, and wherein said light guide directs light generated by said light source in a first direction past said first end.

13. The pavement marker module of claim 1, wherein said housing has a first end spaced apart from a second end, wherein said first end comprises a reflective portion configured for reflecting light, and wherein said second end comprises a reflective portion configured for reflecting light.

14. A pavement marker module comprising:

a housing having a top side spaced apart from a bottom side, said top side defining at least one cavity opening therethrough, said cavity opening providing access to a cavity, said bottom side configured for attachment to a mount surface;

a translucent cover covering said cavity opening;

a light source for generating light, said light source comprising at least one light-emitting diode, said light source received within said at least one cavity;

a light guide optically coupled to said light source, said light guide configured for directing the light generated by the light source through the translucent cover, said light guide received within said at least one cavity;

an energy storage system for storing electrical current and for supplying electrical current to said light source, said energy storage system received within said at least one cavity; and a charging system for generating electrical current for recharging said energy storage system, said charging system comprising at least one vibration energy harvesting device and at least one solar module, said charging system received within said at least one cavity.

15. The pavement marker module of claim 14, wherein said mount surface is a channel surface within a channel defined in a pavement surface.

16. The pavement marker module of claim 15, wherein upon mounting the pavement marker module in the channel, said top side is generally co-planar with the pavement surface.

17. The pavement marker module of claim 14, wherein said mount surface is a pavement surface, and wherein said pavement marker module attached to said mount surface through use of at least one adhesive.

18. The pavement marker module of claim 14, wherein the energy storage system comprises at least one ultracapacitor or at least one battery.

19. The pavement marker module of claim 14, wherein said housing has a first end spaced apart from a second end, wherein said first end comprises a reflective portion configured for reflecting light, and wherein said second end comprises a reflective portion configured for reflecting light.

20. A pavement marker module comprising:

a housing having a top side spaced apart from a bottom side, said top side defining at least one cavity opening therethrough, said cavity opening providing access to a cavity, said bottom side configured for attachment to a mount surface;

a translucent cover covering said cavity opening;

a light source for generating light, said light source comprising at least one light-emitting diode, said light source received within said at least one cavity;

a light guide optically coupled to said light source, said light guide configured for directing the light generated by the light source through the translucent cover, said light guide received within said at least one cavity;

an energy storage system for storing electrical current and for supplying electrical current to said light source, wherein said energy storage system comprises at least one ultracapacitor, at least one battery, or a combination of at least one ultracapacitor and at least one battery, said energy storage system received within said at least one cavity; and a charging system for generating electrical current for recharging said energy storage system, said charging system comprising at least one vibration energy harvesting device and at least one solar module, said charging system received within said at least one cavity.

* * * * *